US010461825B2

(12) United States Patent
Sandberg et al.

(10) Patent No.: US 10,461,825 B2
(45) Date of Patent: Oct. 29, 2019

(54) DISTRIBUTED MIMO AND/OR TRANSMIT DIVERSITY IN A CLOUD-RAN SYSTEM

(71) Applicant: CommScope Technologies LLC, Hickory, NC (US)

(72) Inventors: Stuart D. Sandberg, Acton, MA (US); Vedat Eyuboglu, Weston, MA (US); Balaji B Raghothaman, Chester Springs, PA (US); Luigi Tarlazzi, Bagnacavallo (IT)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/851,364

(22) Filed: Dec. 21, 2017

(65) Prior Publication Data

US 2018/0183502 A1   Jun. 28, 2018

Related U.S. Application Data (60) Provisional application No. 62/438,597, filed on Dec. 23, 2016.

(51) Int. Cl.
*H04W 72/04* (2009.01)
*H04B 7/0456* (2017.01)
(Continued)

(52) U.S. Cl.
CPC ........... *H04B 7/0478* (2013.01); *H04B 7/043* (2013.01); *H04B 7/0465* (2013.01);
(Continued)

(58) Field of Classification Search
CPC ... H04L 5/0053; H04L 5/0023; H04L 5/0048; H04L 1/0026; H04L 27/2626;
(Continued)

(56) References Cited

U.S. PATENT DOCUMENTS

| 5,579,341 A | 11/1996 | Smith et al. |
| 5,748,683 A | 5/1998 | Smith et al. |

(Continued)

FOREIGN PATENT DOCUMENTS

| EP | 2315309 A1 | 4/2011 |
| EP | 2802089 B1 | 2/2019 |

(Continued)

OTHER PUBLICATIONS

European Patent Office, "Extended European Search Report for EP Application No. 15749336.2", "Foreign Counterpart to U.S. Appl. No. 15/118,581", dated Sep. 1, 2017, pp. 1-15, Published in: EP.

(Continued)

*Primary Examiner* — Sai Aung
(74) *Attorney, Agent, or Firm* — Fogg & Powers LLC (57) ABSTRACT

One embodiment is directed to a system that implements a downlink transmission mode that precodes sequences of symbols using a precoder matrix selected from a codebook. Linear transformations are performed on the sequences of precoded symbols using a distribution matrix. The distribution matrix is configured so that each of a plurality of precoder matrices provides perfect steering of transmit power to a corresponding one of a plurality of disjoint subsets of the antenna ports used for the downlink transmission mode. Also, the distribution matrix can be configured so that at least one precoder matrix provides peak power at all of the antenna ports used for the downlink transmission mode.

20 Claims, 5 Drawing Sheets

(51) Int. Cl.
*H04B 7/0426* (2017.01)
*H04L 1/06* (2006.01)
*H04L 27/26* (2006.01)
*G06F 17/16* (2006.01)
*H04L 5/00* (2006.01)

(52) U.S. Cl.
CPC ........ *H04L 1/0606* (2013.01); *H04L 27/2675* (2013.01); *H04W 72/042* (2013.01); *G06F 17/16* (2013.01); *H04L 5/00* (2013.01)

(58) Field of Classification Search
CPC ..... H04L 5/0007; H04L 5/001; H04L 5/0055; H04L 2025/03426; H04L 25/03343; H04L 5/0073; H04L 1/0003; H04L 25/0204; H04L 27/2636; H04L 5/0035; H04L 25/0224; H04L 25/03898; H04W 72/042; H04W 72/0413; H04W 72/0446; H04W 24/10; H04W 88/02; H04W 16/32; H04W 52/146; H04W 52/34; H04W 52/367; H04W 72/0406; H04W 72/082; H04W 72/12; H04W 72/04
See application file for complete search history.

(56) References Cited

U.S. PATENT DOCUMENTS

| | | | |
|---|---|---|---|
| 7,027,770 | B2 | 4/2006 | Judd et al. |
| 7,079,869 | B2 | 7/2006 | Aytur et al. |
| 9,414,399 | B2 | 8/2016 | Eyuboglu et al. |
| 2003/0228854 | A1 | 12/2003 | Morris et al. |
| 2004/0110469 | A1 | 6/2004 | Judd et al. |
| 2008/0150514 | A1 | 6/2008 | Codreanu et al. |
| 2010/0136902 | A1 | 6/2010 | Barak et al. |
| 2010/0278530 | A1 | 11/2010 | Kummetz et al. |
| 2011/0135308 | A1 | 6/2011 | Tarlazzi et al. |
| 2011/0201368 | A1 | 8/2011 | Faccin et al. |
| 2011/0223962 | A1 | 9/2011 | Kuwahara et al. |
| 2012/0008718 | A1 | 1/2012 | Dabak et al. |
| 2012/0033571 | A1* | 2/2012 | Shimezawa ............ H04B 7/026 370/252 |
| 2012/0177011 | A1 | 7/2012 | Xi et al. |
| 2012/0207084 | A1* | 8/2012 | Seo ........................ H04B 7/155 370/315 |
| 2012/0257575 | A1 | 10/2012 | Davydov et al. |
| 2013/0044650 | A1 | 2/2013 | Barker et al. |
| 2013/0076565 | A1 | 3/2013 | Lee et al. |
| 2013/0095871 | A1 | 4/2013 | Soriaga et al. |
| 2013/0188753 | A1 | 7/2013 | Tarlazzi et al. |
| 2013/0308693 | A1 | 11/2013 | Li et al. |
| 2014/0192918 | A1 | 7/2014 | Park et al. |
| 2014/0219255 | A1 | 8/2014 | Eyuboglu et al. |
| 2014/0219267 | A1 | 8/2014 | Eyuboglu et al. |
| 2015/0016441 | A1 | 1/2015 | Hanson et al. |
| 2015/0358104 | A1* | 12/2015 | Ohwatari ............ H04B 7/0456 370/252 |
| 2016/0006548 | A1* | 1/2016 | Yang .................... H04L 5/0094 370/329 |
| 2016/0037550 | A1 | 2/2016 | Barabell et al. |
| 2016/0345342 | A1 | 11/2016 | Eyuboglu et al. |
| 2017/0135121 | A1 | 5/2017 | Eyuboglu et al. |
| 2017/0222698 | A1 | 8/2017 | Lange |
| 2019/0045493 | A1* | 2/2019 | Kimura .................. H04L 27/34 |

FOREIGN PATENT DOCUMENTS

| | | |
|---|---|---|
| WO | 9533350 A1 | 12/1995 |
| WO | 9629834 A1 | 9/1996 |
| WO | 9824256 A2 | 6/1998 |
| WO | 2012075137 A1 | 6/2012 |
| WO | 2016073885 A1 | 5/2016 |
| WO | 2016115545 A2 | 7/2016 |

OTHER PUBLICATIONS

International Search Authority, "International Search Report and Written Opinion from PCT Application No. PCT/US2015/013886", dated Apr. 27, 2015, pp. 1-13, Published in: WO.

United States Patent and Trademark Office, "Office Action for U.S. Appl. No. 15/118,581" dated Jan. 11, 2018, pp. 1-18, Published in: U.S.

International Searching Authority, "International Search Report for PCT Application No. PCT/US2017/067991", "Foreign Counterpart to U.S. Appl. No. 15/851,364", dated Apr. 11, 2018, pp. 1-11, Published in: WO.

* cited by examiner

DISTRIBUTED MIMO AND/OR TRANSMIT DIVERSITY IN A CLOUD-RAN SYSTEM

CROSS-REFERENCE TO RELATED APPLICATIONS

This application claims the benefit of U.S. Provisional Application Ser. No. 62/438,597, filed Dec. 23, 2016, and titled "DISTRIBUTED MIMO AND/OR TRANSMIT DIVERSITY IN A CLOUD-RAN SYSTEM," the contents of which are incorporated herein by reference.

BACKGROUND

Long Term Evolution (LTE) is a standard for high-speed wireless communication for mobile phones and data terminals (collectively referred to here as "user equipment" or "UE"). The LTE standard is developed by the 3rd Generation Partnership Project (3GPP) standards organization.

LTE supports multiple downlink transmission modes, most of which support downlink transmission using multiple antennas. Indeed, support for the use of multiple antennas is a core feature of LTE.

In general, these multiple-antenna LTE downlink transmission modes are performed using precoding. Precoding performs a matrix transformation of v sequences of symbols x into p sequences of symbols y, where v corresponds to the number of layers being used and p corresponds to the number of transmit antenna ports being used. The number of layers being used is also referred to as the "transmission rank." One or two data code words are transmitted per layer. A precoder matrix W is used for precoding.

The multiple-antenna LTE downlink transmission modes that employ precoding use either transmit diversity or spatial multiplexing.

In the case of transmit diversity (for example, LTE downlink transmission mode 2), a single sequence of symbols is transmitted from multiple antennas. A single code word is sent. With transmit diversity using two transmit antennas, the precoding is done using a precoding matrix W specified by the LTE standards that is based on Space-Frequency Block Coding (SFBC). With transmit diversity using four transmit antennas, the precoding is done using a precoding matrix W specified by the LTE standards that is based on SFBC and Frequency-Shift Transmit Diversity (FSTD)

In the case of spatial multiplexing, multiple layers are transmitted simultaneously from multiple antennas. Some forms of multi-antenna transmission (for example, LTE downlink transmission mode 4) make use of a codebook. A codebook is a table that comprises several predefined precoder matrices W that can be selected for use in precoding.

Cell specific reference symbols (CS-RS) are inserted in between data symbols transmitted to the UE. The UE uses the CS-RSs to generate channel state information (CSI) that is fed back to the eNodeB. This CSI includes a rank indicator (RI) and a precoder matrix indicator (PMI). The RI indicates how many layers should be used for the current channel conditions, and the PMI indicates which one of the predefined precoder matrices included in the codebook should be used for the current channel conditions.

However, the precoding schemes used with such multiple-antenna LTE downlink transmission modes are not designed for use with a specific base station or radio access network configuration.

SUMMARY

One embodiment is directed to a method of reusing a resource element to transmit user data to a plurality of items of user equipment using a downlink transmission mode that uses multiple antenna ports. The downlink transmission mode precodes sequences of symbols using a precoder matrix selected from a codebook. The precoding produces sequences of precoded symbols. The method comprises performing linear transformations on the sequences of precoded symbols using a distribution matrix. The distribution matrix is configured so that each of a plurality of precoder matrices provides perfect steering of transmit power to a corresponding one of a plurality of disjoint subsets of the antenna ports used for the downlink transmission mode. The method further comprises determining if the resource element can be reused to transmit user data to the plurality of items of user equipment. The method further comprises, when the resource element can be reused, reusing the resource element to transmit user data to the plurality of items of user equipment by: assigning a respective simulcast group to each of the plurality of items of user equipment that uses a respective one of the plurality of disjoint subsets of antenna ports and transmitting user data to each of the items of user equipment using a respective precoder matrix that provides perfect steering to the respective subset of antenna ports in the respective simulcast group for that item of user equipment.

Another embodiment is directed to a system to provide wireless service to user equipment. The system comprises a controller communicatively coupled to a core network of a wireless service provider and a plurality of radio points to transmit and receive radio frequency signals to and from the user equipment. Each of the radio points associated with at least one antenna and located remote from the controller. The plurality of radio points is communicatively coupled to the controller. The controller and plurality of radio points implement a base station for a radio access network. The system is configured to reuse a resource element in order to transmit user data to a plurality of items of user equipment using a downlink transmission mode that uses multiple antenna ports. The system is configured to implement a downlink transmission mode that precodes sequences of symbols using a precoder matrix selected from a codebook, wherein the precoding produces sequences of precoded symbols. The system is configured to perform linear transformations on the sequences of precoded symbols using a distribution matrix. The distribution matrix is configured so that each of a plurality of precoder matrices provides perfect steering of transmit power to a corresponding one of a plurality of disjoint subsets of the antenna ports used for the downlink transmission mode. The system is configured to determine if the resource element can be reused to transmit user data to the plurality of items of user equipment. The system is configured to, when the resource element can be reused, reuse the resource element to transmit user data to the plurality of items of user equipment by: assigning a respective simulcast group to each of the plurality of items of user equipment that uses a respective one of the plurality of disjoint subsets of antenna ports and transmitting user data to each of the items of user equipment using a respective precoder matrix that provides perfect steering to the respective subset of antenna ports in the respective simulcast group for that item of user equipment.

Other embodiments are disclosed.

The details of various embodiments are set forth in the accompanying drawings and the description below. Other features and advantages will become apparent from the description, the drawings, and the claims.

DETAILED DESCRIPTION

Figure 1:
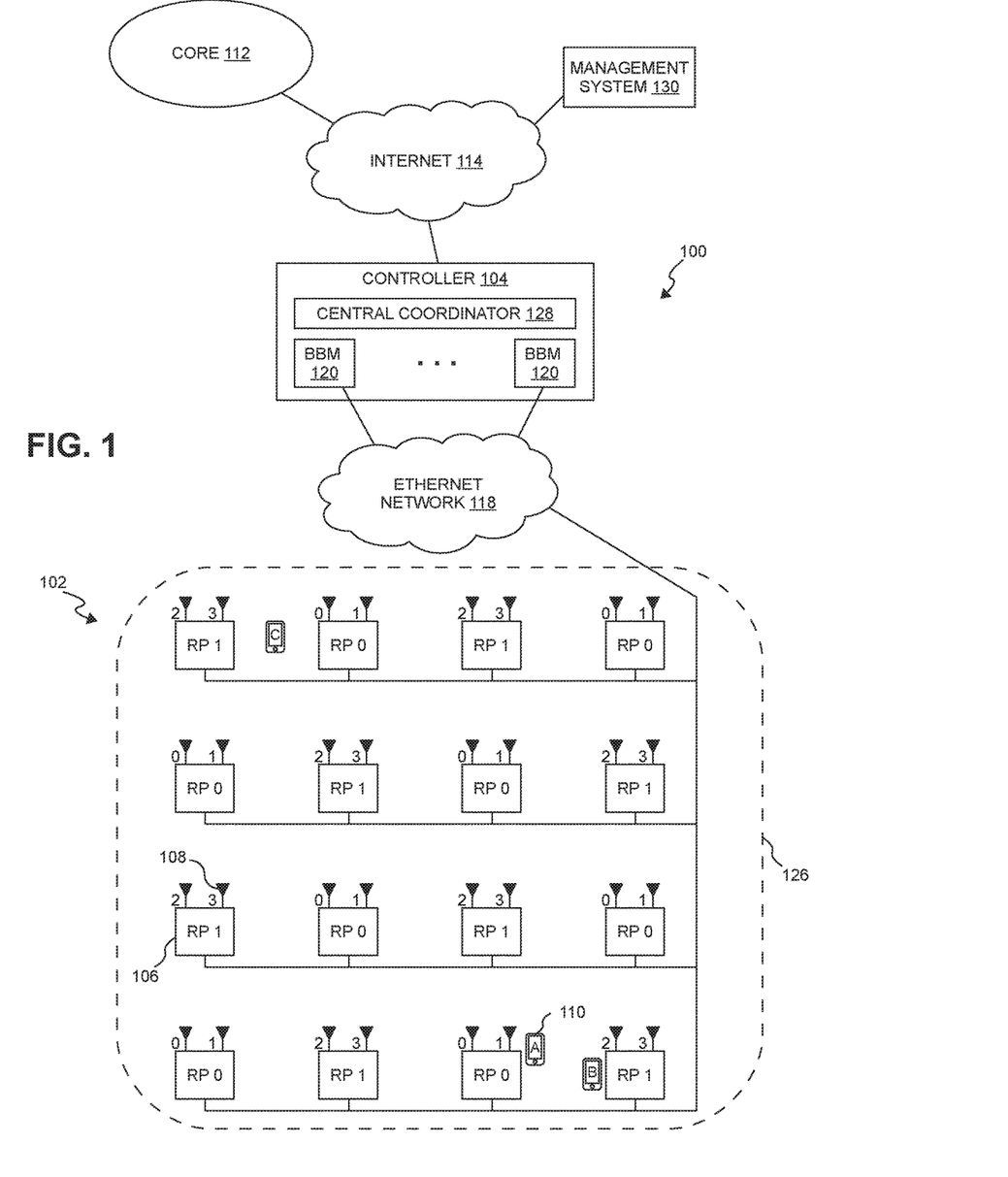
FIG. 1 is a block diagram illustrating one exemplary embodiment of a radio access network in which multiple-antenna downlink transmission modes can be implemented in a distributed manner.

FIG. 1 is a block diagram illustrating one exemplary embodiment of a radio access network (RAN) 100 in which multiple-antenna downlink transmission modes can be implemented in a distributed manner. The RAN 100 is deployed at a site 102 to provide wireless coverage and capacity for one or more wireless network operators. The site 102 may be, for example, a building or campus or other grouping of buildings (used, for example, by one or more businesses, government, other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the RAN 100 at the site 102 is implemented at least in part using a point-to-multipoint distributed base station architecture that employs at least one central controller 104 and multiple radio points (RPs) 106. Each RP 106 includes or is coupled to one or more antennas 108 via which downlink RF signals are radiated to user equipment 110 and via which uplink RF signals transmitted by user equipment (UE) 110 are received.

More specifically, in the example shown in FIG. 1, each RP 106 comprises two antennas 108. Each RP 106 can include or be coupled to a different number of antennas 108.

The RAN 100 is coupled to the core network 112 of each wireless network operator over an appropriate back-haul. In the exemplary embodiment shown in FIG. 1, the Internet 114 is used for back-haul between the RAN 100 and each core network 112. However, it is to be understood that the back-haul can be implemented in other ways.

The exemplary embodiment of the RAN 100 shown in FIG. 1 is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) and a Serving Gateway (SGW) and, optionally, a Home eNodeB gateway (HeNB GW) and a Security Gateway (SeGW) (all of which are not shown in FIG. 1).

Moreover, in this exemplary embodiment, each controller 104 communicates with the MME and SGW in the EPC core network 112 using the LTE Si interface and communicates with other eNodeBs using the LTE X2 interface. In the example shown in FIG. 1, the controller 104 communicates with an outdoor macro eNodeB (not shown) via the LTE X2 interface.

The controller 104 and the radio points 106 can be implemented to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary embodiment shown in FIG. 1, the front-haul that communicatively couples each controller 104 to the one or more RPs 106 is implemented using a standard ETHERNET network 118. However, it is to be understood that the front-haul between the controllers 104 and RPs 106 can be implemented in other ways.

Generally, one or more nodes in a RAN perform analog radio frequency (RF) functions for the air interface as well as digital Layer 1, Layer 2, and Layer 3 (of the Open Systems Interconnection (OSI) model) functions for the air interface.

In the exemplary embodiment shown in FIG. 1, each controller 104 includes one or more baseband modems (BBMs) (or other units) 120 that perform digital Layer-3, Layer-2, and Layer-1 processing for the LTE air interface, and each RP 106 includes (optionally) one or more Layer-1 units (not shown) that implements any Layer-1 processing for the air interface that is not performed in the controller 104 and one or more radio frequency (RF) circuits (not shown) that implement the RF front-end functions for the air interface and the one or more antennas 108 associated with that RP 106.

The baseband modems 120 in the controllers 104 can be configured to perform all of the digital Layer-3, Layer-2, and Layer-1 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 118 is able to deliver the required high data rate.

If the front-haul ETHERNET network 118 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the CUs 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 118. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

Where frequency-domain IQ data is front-hauled between the controllers 104 and the RPs 106, the baseband modems 120 in each controller 104 can be configured to perform all of the digital Layer-3, Layer-2, and Layer-1 processing for the air interface except for the inverse fast Fourier transform (IFFT) in the downlink and the fast Fourier transform (FFT) in the uplink. In this case, the Layer-1 functions in each RP 106 can be configured to implement the digital Layer-1 processing for the air interface that is not performed in the controller 104 (that is, the IFFT in the downlink and the FFT in the uplink).

Where the front-haul ETHERNET network 118 is not able to deliver the data rate need to front haul (uncompressed) time-domain IQ data, the time-domain IQ data can be compressed prior to being communicated over the ETHERNET network 118, thereby reducing the data rate needed communicate such IQ data over the ETHERNET network 118.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each baseband modem 120 in the controller 104 provides the capacity of a single cellular sector. With traditional base stations (for example, with traditional small cell or distributed base stations), the capacity provided by each baseband modem creates a separate cell, having a separate physical cell identifier associated with that cell and transmitting separate control and reference signals associated with that cell. Traditionally, when the capacity provided by several baseband modems (for example, in the form of several small cell base stations) is densely deployed within a site (with the capacity provided by each baseband modem creating a separate cell), multiple overlapping cells are created with interference at cell borders. This happens even when there is a traditional central service controller that is coordinating multiple small cell base stations. The service controller can assist with network configuration and optimization, handovers, and backhaul aggregation, but does not address the issue that each baseband modem forms a separate, stand-alone cell and interferes with its neighboring separate, standalone cells. The signal quality in these overlap areas can drop significantly, reducing data speeds and impairing voice quality. Also, creating multiple separate cells generates frequent handovers, for example, in the form of "ping-ponging" of stationery users in border areas, or as users move about the site. This further degrades the user experience and creates the potential for handover failures.

To address these issues with creating separate cells for the capacity provided by each baseband modem, in the exemplary embodiment shown in FIG. 1, the capacity provided by multiple baseband modems 120 can be used within a common, single "super" cell 126, sharing a common physical cell identifier and for which common control and reference signals are transmitted. In this embodiment, each controller 104 includes a central coordinator 128 that performs central resource block scheduling for all of the baseband modems 120 across all of the RPs 106 and all of the user equipment 110 associated with those baseband modems 120. Frequency reuse techniques can be used to create virtual sectors within the single super cell 126, with different baseband modems 120 providing capacity to each of the virtual sectors. The central coordinator 128 can also serve as an aggregation point for data that is transmitted and received using multiple baseband modems 120 and multiple RPs 106.

The central coordinator 128 can schedule multiple RPs 106 to jointly transmit to an individual UE 110, helping overcome an interfering macro signal without having to boost RP transmit power such that it would interfere with the macro. Similarly, the central coordinator 128 can schedule multiple RPs 106 to jointly receive uplink transmissions from a single UE 110, which are then combined at the controller 104 (either in the baseband modem 120 or in the central coordinator 128). This inter-RP uplink combining enables the UE 110 to transmit at a lower power, reducing its interference on the macro uplink. Additional details regarding the creation of such a super cell 126 can be found in U.S. patent application Ser. No. 13/762,283, mentioned above.

The baseband modems 120 and the central coordinator 128 in each controller 104 can be implemented in software or firmware executing on one or more suitable programmable processors. The baseband modems 120 and the central coordinator 128 in each controller 104 (or portions thereof) can be implemented in other ways (for example, in a field programmable gate array (FPGA), application specific integrated circuit (ASIC), etc.). The baseband modem 120 and the central coordinator 128 in each controller 104 can be implemented in other ways.

Likewise, one or more Layer-1 units (not shown) in each RP 106 can be implemented in software or firmware executing on one or more suitable programmable processors. The one or more Layer-1 units in each RP 106 (or portions thereof) can be implemented in other ways (for example, in a field programmable gate array (FPGA), application specific integrated circuit (ASIC), etc.). The one or more RF circuits in each RP 106 can be implemented using one or more RF integrated circuits (RFICs) and/or discrete components. The Layer-1 units and RF circuit in each RP 106 can be implemented in other ways.

In some implementations, the common, single super cell 126 is created using baseband modems 120 from multiple controllers 104, where resource block scheduling is performed across all of the baseband modems 120 from the multiple controllers 104 (for example, using one or more of the central coordinators 128 in the controllers 104 and/or using a separate global coordinator).

Although the exemplary embodiment shown in FIG. 1 makes use of a central coordinator 128 to create a super cell 126 as described above, it is to be understood that other embodiments are implemented in other ways (for example, where the controllers 104 do not include such a central coordinator 128 and instead such coordination functions are incorporated into each baseband modem 120).

The controllers 104 may also include certain MME functionality (not shown) and SGW functionality (not shown), thus allowing traffic to flow directly between UE 110 and a destination node on the Internet 114 or on a local network at the site 102 without traversing an operator's core network 112.

In the exemplary embodiment shown in FIG. 1, a management system 130 is communicatively coupled to the controllers 104 and RPs 106, for example, via the Internet 114 and ETHERNET network 118 (in the case of the RPs 106).

In the exemplary embodiment shown in FIG. 1, the management system 130 communicates with the various elements of the RAN 100 using the Internet 114 and the ETHERNET network 118. Also, in some implementations, the management system 130 sends and receives management communications to and from the controllers 104, each of which in turn forwards relevant management communications to and from the RPs 106.

As noted above, the controller 104 and RPs 106 together are used to implement an LTE eNodeB. In this example, the controller 104 and RPs 106 are configured to implement the multiple-antenna LTE downlink transmission modes in a distributed manner. The multiple-antenna LTE downlink transmission modes are implemented in a "distributed" manner in the sense that the multiple antennas for a given logical eNodeB are not co-located with each other and, instead, are deployed using radio points 106 that are located remotely from each other.

Each downlink transmission mode makes use of one or more "antenna ports," which are logical entities that are distinguished by their reference signal sequences. Thus, each multiple-antenna downlink transmission mode makes use of multiple antenna ports. In the embodiments described here, for the downlink transmission mode that is being used, each antenna port as assigned to a respective one or more antenna 108 in the RAN 100.

As shown in FIG. 1, for four-antenna downlink transmission modes, each antenna port can be assigned one of four antenna port indices (0, 1, 2, or 3). Each of the distributed antennas 108 in the RAN 100 can also be assigned one of four antenna indices (0, 1, 2, or 3), where each antenna index corresponds to a respective antenna port index for that transmission mode.

In general, the RPs 106 (and associated antennas 108) are physically arranged within the coverage area of the RAN 100 so that four adjacent antennas 108 will be assigned four different antenna indices. Also, the antennas 108 are assigned and arranged to minimize the number of antennas 108 with the same antenna index that are physically near each other.

Figure 2:
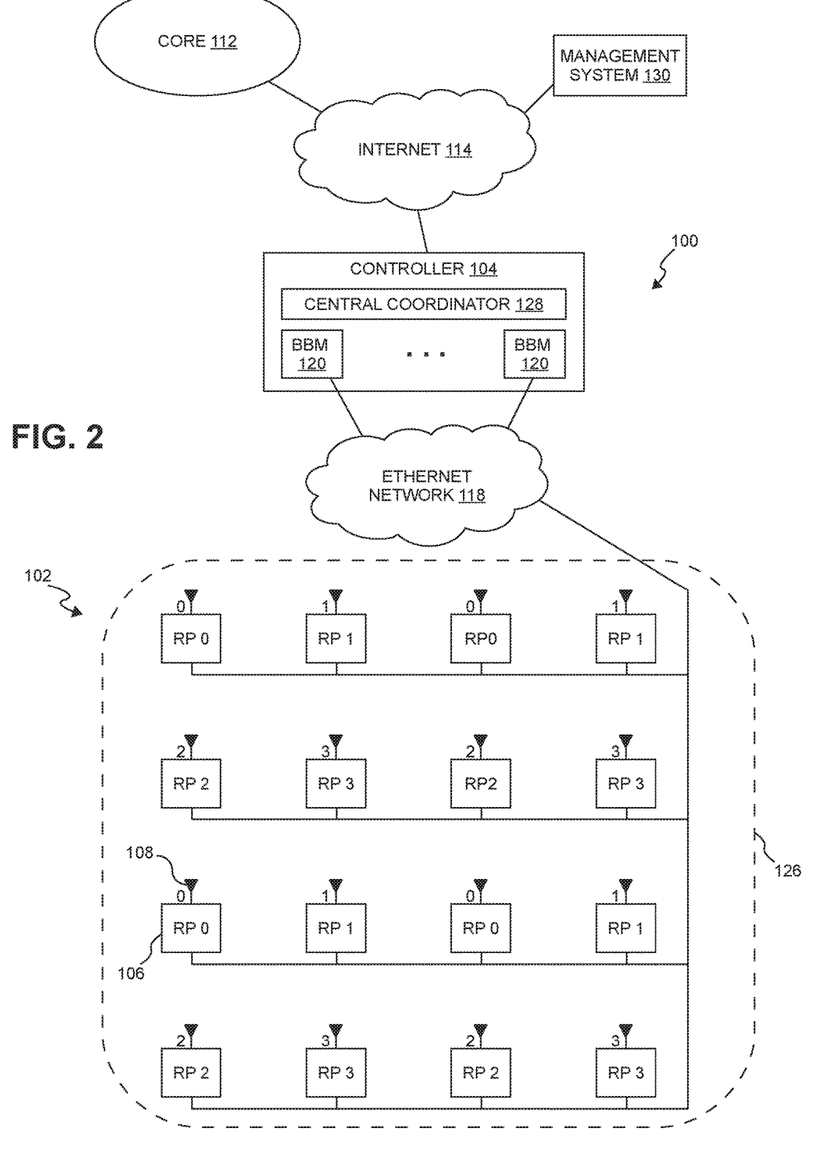
FIG. 2 is a block diagram illustrating another exemplary embodiment of a radio access network in which multiple-antenna downlink transmission modes can be implemented in a distributed manner.

In the example shown in FIG. 1, each RP 106 includes or is coupled to two antennas 108. However, it is to be understood that other embodiments can be implemented in other ways (for example, as shown in FIG. 2). In the example shown in FIG. 1, each RP 106 is assigned a respective one of two RP indices (0 or 1), where the RPs assigned the RP index 0 are labelled "RP 0" and where the RPs assigned the RP index 1 are labelled as "RP 1." The two antennas 108 associated with each RP 0 are assigned antenna indices 0 and 1, respectively, (and are labelled "antenna 0" and "antenna 1," respectively), and the two antennas 108 associated with each RP 1 are assigned antenna indices 2 and 3, respectively, (and are labelled "antenna 2" and "antenna 3," respectively). In this example, adjacent pairs of RPs 106 are assigned different RP indices so that the associated antennas 108 are assigned four different antenna indices.

In this example, the RPs 106 are arranged in a generally "checkerboard" pattern with RPs 106 assigned the first RP index alternating in both of two directions with RPs 106 assigned the second RP index.

FIG. 2 illustrates another example where each RP 106 includes or is coupled to a single antenna 108. In this example, each RP 106 is assigned a respective one of four RP indices (0, 1, 2, or 3), where the RPs 106 assigned the RP index 0 are labelled as "RP 0," the RPs 106 assigned the RP index 1 are labelled as "RP 1," the RPs 106 assigned the RP index 2 are labelled as "RP 2," and the RPs 106 assigned the RP index 3 are labelled as "RP 3." Each antenna 108 associated with each RP 0 is assigned antenna index 0 (and is labelled "antenna 0"), each antenna 108 associated with each RP 1 is assigned antenna index 1 (and is labelled "antenna 1"), each antenna 108 associated with each RP 2 is assigned antenna index 2 (and is labelled "antenna 2"), and each antenna 108 associated with each RP 3 is assigned antenna index 3 (and is labelled "antenna 3"). In this example, adjacent four-tuples of RPs 106 are assigned different RP indices so that the associated antennas 108 are assigned four different antenna indices.

These assignments can be made manually (for example, using the management system 130). During initialization of the RAN 100, receive power measurements of user-equipment transmissions are made at each RP 106 for many user-equipment positions. These power measurements are used to determine the antenna and radio point assignments. The controller 104 and the RPs 106 are made aware of the various assignments.

As used herein, a "simulcast group" for a given UE 110 is the set of RPs 106 and associated antennas 108 that are used to transmit downlink user data to that UE 110. The cell-specific reference symbols are radiated from all of the antennas 108 and RPs 106 in the RAN 100. As a result, the rank indicator (RI) (that is, how many layers should be used for the current channel conditions), and the precoding matrix indicator (PMI) (that is, which predefined precoder matrix included in the codebook should be used for the current channel conditions) are selected based on transmissions from all of the antennas 108 and RPs 106.

However, in this example, the user-plane data for each UE 110 is radiated from less than all of the antennas 108 and RPs 106. That is, the user-plane data for each UE 110 is only radiated from the antennas 108 and RPs 106 that are in that UE's simulcast group. This can result in bias when the user-plane transmissions are demodulated and decoded by each UE 110. This bias results from the difference between the composite RF channel under which each UE 110 receives the cell-specific reference symbols and the composite RF channel under which each UE 110 receives the user-plane transmissions.

As used herein "reuse" refers to situations where two or more UEs 110 receive user-plane transmissions using the same resource elements in the same cell. When reuse is used with a multiple-antenna downlink transmission mode, one approach to supporting such reuse is to define simulcast groups that include the antennas 108 (and associated RPs 106) assigned to all of the antenna ports used by that downlink transmission mode. That is, where this type of reuse is being used with a downlink transmission mode that uses four antenna ports, each simulcast group for a UE 110 in reuse includes antennas 108 (and associated RPs 106) that are assigned to all four antenna ports.

For example, reuse can be used with a downlink transmission mode that uses four antenna ports where a first UE 110 is provided wireless service by a first simulcast group that includes a first pair of RPs 0 and 1 (and associated four antennas 0, 1, 2, and 3) and a second UE 110 is provided wireless service by a second simulcast group that includes a second pair of RPs 0 and 1 (and associated four antennas 0, 1, 2, and 3). Each UE is sufficiently physically separated from the antennas 108 of the other UE's simulcast group to enable such resource-element reuse. This first approach to reuse is also referred to here as "far" reuse.

However, there may not be many opportunities for far reuse to be employed.

Another approach to employing reuse with a multiple-antenna downlink transmission mode is to define simulcast groups that include antennas 108 (and associated RPs 106) assigned to less than all of the antenna ports used by the multiple-antenna downlink transmission mode. For example, where reuse is being used with a downlink transmission mode that uses four antenna ports, each simulcast group can include physical antennas 108 (and associated RPs 106) assigned to two of the antenna ports.

With this second approach to reuse, for each UE 110 and corresponding simulcast group, some of the antenna ports will be mapped to the respective antennas 108 and associated RPs 106 in that simulcast group, while the other antenna ports will not be mapped to any physical antennas 108 or associated RPs 106 and the symbols for those other antenna ports will not transmitted.

For example, reuse can be used with a downlink transmission mode that uses four antenna ports where a first UE 110 is provided wireless service by a first simulcast group that includes a first RP 0 (and associated two antennas 0 and 1) and a second UE 110 is provided wireless service by a second simulcast group that includes RP 1 (and associated two antennas 2, and 3). Each UE 110 is sufficiently physically separated from the antennas 108 of the other UE's simulcast group to enable such resource-element reuse. This second approach to reuse is also referred to here as "near" reuse.

By transmitting the user-plane data for each UE 110 from less than all of the antenna ports, interference can be reduced and the number of opportunities for near reuse can be increased (relative to the number of opportunities for far reuse). However, in the absence of the techniques described below, near reuse can result in bias when the user-plane transmissions are demodulated and decoded by each UE 110. This bias results from the difference between the composite RF channel under which each UE 110 receives the cell-specific reference symbols and the composite RF channel under which each UE 110 receives the user-plane transmissions.

As noted below, near reuse can be combined with far reuse.

Figure 3:
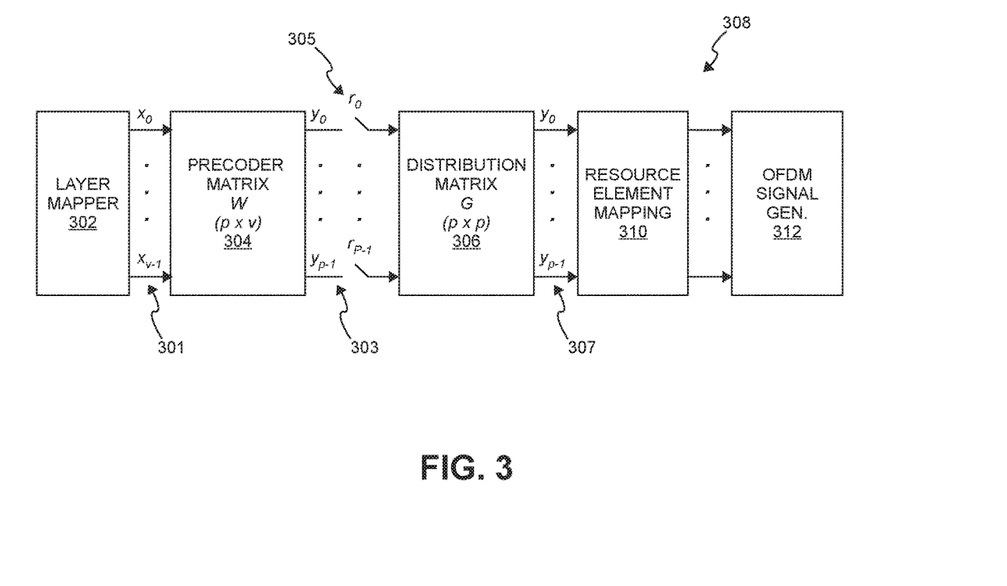
FIG. 3 is a block diagram illustrating an exemplary embodiment of a scheme for a performing a linear transformation on sequences of precoded symbols using a distribution matrix.

FIG. 3 is a block diagram illustrating an exemplary embodiment of a scheme for addressing this issue with bias. The exemplary embodiment shown in FIG. 3 is described here as being implemented using the RAN 100 shown in FIG. 1, though it is to be understood that other embodiments can be implemented in other ways (for example, using the example shown in FIG. 2).

The scheme shown in FIG. 3 can implemented in the controller 104, the radio point 106, or both the controller 104 and the radio point 106. More specifically, the processing described here can be implemented at least in part in software or firmware (for example, by programming a programmable processor such as a general-purpose microprocessor or using a field programmable gate array (FPGA)). The processing can also be implemented at least in part in other ways (for example, implemented in discrete circuitry or using an application specification integrated circuit (ASIC)).

As shown in FIG. 3, v sequences of symbols x 301 are received from the layer mapper 302 that performs standard LTE layer mapping (if necessary) for the selected LTE downlink transmission mode, where v corresponds to the number of layers being used.

Standard LTE precoding of the sequences of symbols x 301 is performed for the selected LTE downlink transmission mode. This standard LTE precoding is performed using a precoder matrix W 304. The precoder matrix W 304 is a p×v matrix, where p corresponds to the number of transmit antenna ports being used for the selected LTE downlink transmission mode and again v corresponds to the number of layers being used.

The result of performing the standard LTE precoding is p sequences of symbols y 303.

A linear (matrix) transformation is performed on the resulting sequence of symbols y 303 resulting from the standard LTE precoding. This second matrix transformation is performed using a second matrix G 306. This second matrix transformation is also referred to here as the "distribution" transformation, and the second matrix G is also referred to here as the "distribution" matrix G.

The distribution matrix G 306 is a p×p matrix, where again p is the number of transmit antenna ports being used for the selected LTE downlink transmission mode. The distribution matrix G 306 is configured to spatially distribute transmit power across the various transmit antenna ports being used for the associated downlink transmission mode.

Some LTE downlink transmission modes employ closed-loop spatial multiplexing. For such transmission modes, cell-specific reference symbols (CS-RS) r 305 are inserted at the inputs to the distribution matrix G 306. As a result, the CSI (including the RI and PMI) that is generated by the UE 110 and that is fed back to the controller 104 reflects the transformation performed using the distribution matrix G 306.

The result of performing the distribution transformation using the distribution matrix G 306 is p sequences of symbols y 307, where p corresponds to the number of transmit antenna ports being used for the selected LTE downlink transmission mode. The resulting sequences of symbols y 307 are then used for subsequent standard LTE processing 308 (for example, resource element mapping 310 and OFDM signal generation 312) in the controller 104 and/or radio points 106.

By including an appropriately configured distribution matrix G, the UEs 110 should be able to accurately measure the received power of reference symbols, independent of the location of each UE 110 and of the choice of reference symbols. To do this, the distribution matrix G is configured to be a unitary matrix and to have, for each column of the distribution G matrix, a significant (non-zero) gain for the entry associated with each antenna port. Not doing this would introduce correlations on the antenna ports and, as a result, lower throughput.

The distribution matrix G can be configured to steer the transmit power towards particular antenna ports (and associated RPs 106) when a particular precoder matrix is used. Doing this can be used to enable near reuse of the same resource elements by two or more UEs 110 in certain circumstances.

Even when such near reuse is not employed, the use of such a distribution matrix G (which steers transmit power toward particular antenna ports and associated RPs 106 when a particular precoder matrix is used) can also enable somewhat higher throughput for an individual UE 110 that is located near a particular RP 106.

In the near reuse example described above in connection with FIG. 1, without the use of the distribution matrix G as described in more detail below, the channel that is experienced by user-plane downlink transmissions to each of the UEs A and B is different from the channel experienced during transmission of the cell-specific reference symbols to each of the UEs A and B. In such a situation, the cell-specific reference symbols are transmitted to each UE A and B using all of the antennas ports (and associated antennas 108 and RPs 106), whereas user data is transmitted to UE A only from the specific RP 0 and associated antennas 0 and 1 in the simulcast group defined for UE A and user data is transmitted to UE B only from the specific RP 1 and associated antennas 2 and 3 in the simulcast group defined for UE B.

For such reused resource elements, the symbols that would normally be transmitted to UE A from RP 1 (and antennas 2 and 3) are not transmitted (that is, are "purged"). Likewise, for such reused resource elements, the symbols that would normally be transmitted to UE B from RP 0 (and antennas 0 and 1) are purged. This difference in the channel can result in bias error in the demodulation of the received symbols by UEs A and B.

The distribution matrix G can be used to reduce or eliminate such bias during such near reuse of resource elements. This is done by using a distribution matrix G that is configured so that, for a given LTE downlink transmission mode, a first precoder matrix (having a corresponding PMI) in the associated codebook provides perfect steering of the transmit power to the antenna ports assigned to antennas 0 and 1 (and the associated RPs 0) and a second precoder matrix (having a corresponding PMI) in the associated codebook provides perfect steering of the transmit power to the antenna ports assigned to antennas 2 and 3 (and the associated RPs 1).

As used here, "perfect" steering to a given set of antenna ports (and associated antennas 108 and RPs 106) refers to providing peak power to those antenna ports while providing no or extremely limited power to the other antenna ports (that is, the antenna ports that are not being steered to). For example, such perfect steering can be configured to provide 3 dB higher power on each antenna port that is being steered to so that an output power (Pa) of −3 dB can be used with peak transmit power.

The controller 104 can be configured to determine if the two UEs A and B should be put into near reuse for some resource elements based on measurements of reference signals made at the UEs A and B and/or at the radio points 106.

For example, such determination can be made based on power measurements made by the radio points 106 and reported to the controller 104. These power measurements can be made based on Sounding Reference Signal (SRS) transmissions from the UEs 110.

For example, the controller 104 can be configured to determine if the power measurements for the two UEs A and B indicate that it is appropriate for user-data downlink transmissions to one UE (UE A in this example) to use that first PMI (which perfectly steers to RP 0) and that it is appropriate for user-data downlink transmissions to the other UE (UE B in this example) to use the second PMI (which perfectly steers to RP 1). If the controller 104 determines that this is the case, the UEs A and B can be put into near reuse and the controller 104 uses the first PMI for user-data transmissions to UE A and uses the second PMI for user-data transmissions to UE B. As a result of the perfect steering to the RP near each UE, the purging of the output symbols for the respective other RP does not cause any bias since peak power is already being provided on the antennas ports associated with the respective near RP and very little power is being provided on the antennas ports associated with the other RP. This results in improved transmission performance.

Thus, the distribution matrix G can be configured to provide perfect steering to each RP 106 for a respective PMI for each of the one and two layer multiple-antenna LTE downlink transmission modes used in the RAN 100. These PMIs can be used to enable resource element reuse in more situations.

The distribution matrix G can also be used to provide increased transmission performance for single-user transmission (that is, when near reuse is not be used for a UE). The distribution matrix G can be configured so that, for a given multiple-antenna downlink transmission mode, a precoder matrix (having a corresponding PMI) in the associated codebook distributes transmit power to all of the antenna ports used for the downlink transmission mode. When such a precoder matrix is being used to provide single-user user-plane transmission to a UE 110, the simulcast group defined for that UE 110 would include at least one RP 106 (with a relatively low path loss to the UE) that is associated with each of the antenna ports used for that downlink transmission mode.

For example, in the example described above in connection with FIG. 1, a precoder matrix (having a corresponding PMI) in the associated codebook distributes transmit power to all four antenna ports (and antennas 108 assigned all of the four antenna indices 0, 1, 2, and 3 and associated RPs 0 and 1) used for the downlink transmission mode. In this example, the simulcast group used for the UE C includes at least one RP that is associated each of the four antenna ports. That is, the simulcast group used for UE C includes at least one RP 0 (and the associated antennas 0 and 1) and at least one RP 1 (and the associated antennas 2, and 3).

These conditions are important for single user transmission when the UE 110 is nearly equidistant from antennas 108 assigned all of the antenna indices. This situation where a UE 110 is nearly equidistant from antennas 108 assigned all of the antenna indices is also referred to here as the UE 110 being in the "center" of antennas 108 (and the associated RPs 106).

What follows is one example of a distribution matrix G that is unitary, that provides perfect power steering for at least one of the PMIs used for LTE and that provides peak power at all of the transmit antennas 108 for at least one of the PMIs used for LTE.

$$G = sqrt(1/8) * \begin{bmatrix} -1+1i & 1-1i & 1+1i & 1+1i \\ 1-1i & -1+1i & 1+1i & 1+1i \\ 1+1i & 1+1i & 1-1i & -1+1i \\ 1+1i & 1+1i & -1+1i & 1-1i \end{bmatrix}$$

By virtue of the unitary property of the distribution matrix G, the PMIs that provide perfect steering may result in excess power at the transmit antennas 108. This can be addressed using the referenceSignalPower (Pa) parameter defined by the LTE standard. The Pa parameter can be set to have the transmit power of resource elements carrying user data be the same as, greater than, or less than the transmit power of resource elements carrying the cell-specific reference signals.

In one embodiment, to address the issue with excess transmit power, when reuse is enabled using perfect power steering to less than all of the transmit antenna ports as described above, the controller 104 can use a referenceSignalPower (Pa) less than 0 dB (that is, Pa<0 dB). In such an embodiment, when single-user transmission is used for a UE 110 between RPs 106 with a PMI that provides peak power at all of the antenna transmit ports, the controller 104 can use a referenceSignalPower equal to 0 dB (that is, Pa=0 dB).

In such an embodiment, the controller 104 can be configured to monitor the receive power measurements for a UE 110 that are made at the radio points 106, to determine whether a UE 110 is a candidate for reuse, and to configure the referenceSignalPower (Pa) for the UE 110 accordingly.

Alternatively, in other embodiments, the controller 104 can be configured to use a fixed referenceSignalPower of 0 dB (that is, Pa=0 dB) and reduced transmit power to avoid saturation in reuse, with a reduction in rate in some cases for single-user transmission.

In one embodiment, the controller 104 performs both the precoding transformation and the distribution transformation and communicates the resulting the symbols y to the appropriate radio points 104 for subsequent LTE processing. In such an embodiment, the insertion of any CS-RSs is performed by the controller 104. Each symbol is associated with a respective transmit antenna port and is sent to the associated one or more radio points 106 in the simulcast group assigned to that UE 110.

In another embodiment, each radio point 106 performs the precoding transformation and the distribution transformation for the transmit antenna ports that are assigned to that radio point 106. In such an embodiment, the controller 104 communicates to each radio point 106 the input symbols x output by the layer mapper 302 and the RI and PMI feedback from the UE 110. Each radio point 106 generates the sequence of output symbols y for the transmit antenna ports assigned to that radio point 106 by performing both the precoding transformation and the distribution transformation (using, for example, a precoder matrix W 304 and a distribution matrix G 306 implemented in that radio point 106). Each radio point 106 performs the insertion of any CS-RSs and the distribution transformation on the inserted CS-RSs (using, for example, a distribution matrix G 306 implemented in that radio point 106). Also, each radio point 106 performs the subsequent standard LTE processing 308.

Figure 4:
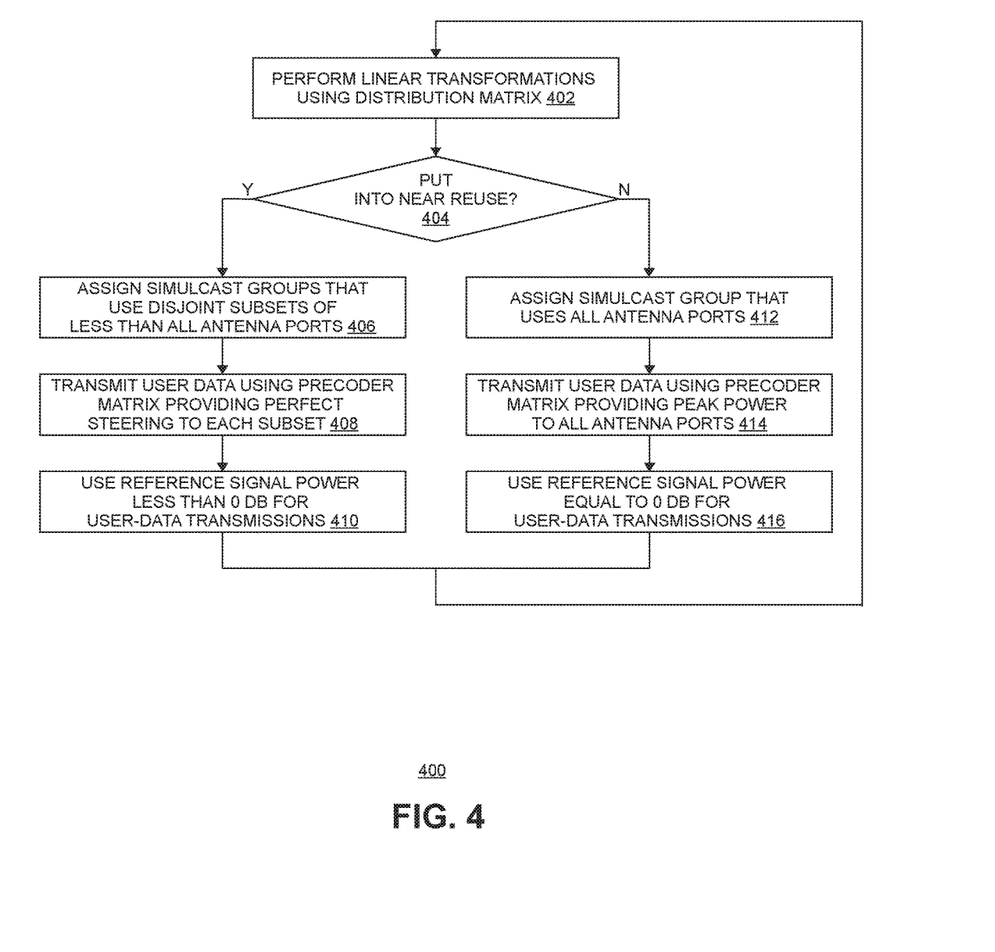
FIG. 4 is a flow diagram of one exemplary embodiment of a method of transmitting data using a multiple-antenna downlink transmission mode with distributed antennas.

FIG. 4 is a flow diagram of one exemplary embodiment of a method 400 of transmitting data using a multiple-antenna downlink transmission mode with distributed antennas. The embodiment of method 400 shown in FIG. 4 is described here as being implemented in the RAN 100 shown in FIG. 1. More specifically, the processing associated with method 400 is described here as being implemented by the controller 104 of the RAN 100. Also, in this exemplary embodiment, the distribution matrix G described above in connection with FIG. 3 can be used. It is to be understood that other embodiments can be implemented in other ways.

Method 400 comprises performing linear transformations on sequences of precoded symbols using a distribution matrix G (block 402).

The antenna ports used for the downlink transmission mode are divided into multiple disjoint subsets, where the number of subsets used is determined based on the number of UEs 110 that can be put into reuse to use the same one or more resource elements. The subsets are "disjoint" in that no antenna port is in both subsets.

In this exemplary embodiment implemented using the configuration shown in FIG. 1, up to two UEs 110 near a pair of RPs 0 and 1 can be placed into near reuse and, therefore, the antenna ports are divided into two disjoint subsets. A first subset of the antenna ports includes antenna ports 0 and 1 and is associated with the RPs 106 assigned the RP index 0 and the antennas 108 assigned the antenna indices 0 and 1. A second subset of the antenna ports includes antenna ports 2 and 3 and is associated with the RPs 106 assigned the RP index 1 and the antennas 108 assigned the antenna indices 2 and 3. As described in more detail below, two UEs 110 that are in near reuse can be placed into far reuse with respect to one or more other UEs have high path loss with respect to those two UEs 110.

As described above, the downlink transmission mode operates by precoding sequences of symbols using a precoder matrix selected from a codebook. The precoding produces sequences of precoded symbols. A respective sequence of precoded symbols is produced for each antenna port used for that downlink transmission mode.

The system is configured to perform linear transformations on the sequences of precoded symbols using the distribution matrix G. If each sequence has N symbols, N linear transformations are performed using the distribution matrix G. The nth transformation is obtained as Gy, where vector y is a p×1 vector, the kth element of which being the nth symbol in sequence k, and the nth transformation outputs vector y representing the p physical antenna output ports for the nth resource element.

The distribution matrix G is configured so that, for each disjoint subset of antenna ports used for the downlink transmission mode, the codebook includes of one or more corresponding precoder matrices that provide perfect steering of transmit power to the antenna ports in that subset.

Also, in this exemplary embodiment, the distribution matrix G is configured so that at least one precoder matrix provides peak power to all of the antenna ports used for the transmission mode.

Method 400 comprises, for each active UE 110, determining whether that UE 110 can be placed into near reuse with another active UE 110 (block 404).

In this exemplary embodiment, two UEs 110 can be put into near reuse if simulcast groups can be defined for those two UEs 110 that are "orthogonal" and all of the RPs 106 (and associated antennas 108) in the simulcast group for a first one of the UEs 110 are assigned to a first subset of the antenna ports and all of the RPs 106 (and associated antennas 108) in the simulcast group for the other UE 110 are assigned to a second subset of the antenna ports, where the first and second subsets are disjoint. The simulcast groups for two UEs 110 are orthogonal if the simulcast groups defined for the two UEs 110 do not include any common RPs 106. If both conditions are true, then the controller 104 uses those simulcast groups for the two UEs 110.

Generally, this means that the first UE 110 is close to RPs 106 (and associated antennas 108) assigned to the first subset of the antenna ports but not close to RPs 106 (and associated antennas 108) assigned to the second subset of the antenna ports and the second UE 110 is close to RPs 106 (and associated antennas 108) assigned to the second subset of the antenna ports but not close to RPs 106 (and associated antennas 108) assigned to the first subset of the antenna ports.

In this exemplary embodiment, the controller 104 monitors the received power measurements made at each radio point 106 in the RAN 100 and determines if orthogonal simulcast groups can be defined for those two UEs 110 based on the power measurements.

In one implementation of such an embodiment, the controller 104 uses a "signature vector" (SV) determined for each active UE 110 based on receive power measurements made at each radio point 106 for that UE 110. The controller 104 maintains a signature vector for each UE 110 that includes, for each RP 106 associated with the cell, a signal reception metric indicative of the power level being received by that RP 106 from that UE 110 (for example, a signal-to-noise plus interference ratio (SNIR)). This signature vector is a measure of the UE's proximity to each RP 106 associated with the cell and is used to track the mobility of the UE 110.

In such an implementation, the controller 104 determines if orthogonal simulcast groups can be defined for those two UEs 110 by quantizing the SV for each UE 110 to one of two values {0,1} per RP 106 based on the received power metric measured at each RP 106 relative to the peak received power metric measurement. Various algorithms can be used to quantize received power metric measured at each RP 106 to one of the two values.

In this implementation, a UE 110 is considered "close" to an RP 106 if the received power metric measured by that RP 106 for that UE 106 is quantized to a value of 1, and a UE 110 is not considered "close" to an RP 106 if the received power metric measured by that RP 106 for that UE 110 is quantized to a value of 0.

The simulcast group for each UE 110 is then determined by selecting those RPs 106 having a 1 in the SV for that UE 110. Then, the simulcast groups for the two UEs 110 are orthogonal if the simulcast groups defined for the two UEs 110 do not include any common RPs 106. Also, it is determined if all of the RPs 106 (and associated antennas 108) for a first one of the UEs 110 are assigned to a first subset of the antenna ports and all of the RPs 106 (and associated antennas 108) for the other UE 110 are assigned to the second subset of the antenna ports, where the first and second subsets are disjoint.

In this exemplary embodiment implemented using the configuration shown in FIG. 1, a first subset of the antenna ports includes antenna ports 0 and 1 and is associated with the RPs 106 assigned the RP index 0 and the antennas 108 assigned the antenna indices 0 and 1. A second subset of the antenna ports includes antenna ports 2 and 3 and is associated with the RPs 106 assigned the RP index 1 and the antennas 108 assigned the antenna indices 2 and 3. In this exemplary embodiment, two active UEs 110 can be can be placed into near reuse if a first simulcast group can be defined for one of the active UEs 110 that includes only RPs 106 and antennas 108 assigned to the first subset of the antenna ports and a second simulcast group can be defined for the other one of the active UEs 110 that includes only RPs 106 and antennas 108 assigned to the second subset of the antenna ports. That is, two active UEs 100 can be can be placed into near reuse if a first simulcast group can be defined for one of the active UEs 110 that includes only RPs 106 assigned the RP index 0 (and the associated antennas 108 assigned the antenna indices 0 and 1) and a second simulcast group can be defined for the other one of the active UEs 110 that includes only RPs 106 assigned the RP index 1 (and the associated antennas 108 assigned the antenna indices 2 and 3).

In the example shown in FIG. 1 and described above, UE A can be placed into near reuse with UE B since the simulcast group defined for UE A includes only RPs 106 in the first subset of antenna ports (that is, RP 0 and antennas 0 and 1) and the simulcast group defined for UE B includes only RPs 106 in the second subset of antenna ports (that is, RP 1 and antennas 2 and 3).

In other implementations, the determination as to whether a UE 110 can be placed into near reuse with another active UE 110 is made in other ways.

Method 400 further comprises, if an active UE 110 can be placed into near reuse with another active UE 110, reusing one or more resource elements by assigning a respective simulcast group to each UE 110 that uses a respective one of the plurality of disjoint subsets of antenna ports (block 406) and transmitting user data to each UE 110 using a respective precoder matrix that provides perfect steering to the respective subset of antenna ports in the simulcast group assigned to that UE 110 (block 408).

In this exemplary embodiment implemented using the configuration shown in FIG. 1, if an active UE 110 can be placed into near reuse with another active UE 110, one of the active UEs 110 is assigned a first simulcast group defined for it that includes only RPs 106 and antennas 108 assigned to the first subset of the antenna ports (that is, RP 0 and antennas 0 and 1) and the other active UE 110 is assigned a second simulcast group defined for it that includes only RPs 106 and antennas 108 assigned to the second subset of the antenna ports (that is, RP 1 and antennas 2 and 3). Then, the first precoder matrix can be used for transmitting user data to the first active UE 110 (UE A in the example shown in FIG. 1) and the second precoder matrix can be used for transmitting user data to the second active UE 110 (UE B in the example shown in FIG. 1).

In the embodiment shown in FIG. 4, method 400 further comprises, if an active UE 110 can be placed into near reuse with another active UE 110, using a referenceSignalPower (Pa) less than 0 dB (that is, Pa<0 dB) for user-data transmissions to those UEs 110 using the one or more shared resource elements (block 410). As noted above, this is done to avoid transmit power in excess of peak. It is to be understood, however, that in other embodiments, this is not done.

Method 400 comprises, if an active UE 110 cannot be placed into near reuse with any other active UE 110, using said one or more resource elements to transmit user data to one of UEs 110 by assigning to that UE 110 a simulcast group that uses all of the antenna ports for the downlink transmission mode (block 412) and transmitting user data to that UE 110 using the precoder matrix that provides peak power to all of the antenna ports (block 414).

As noted above, this is done to provide increased transmission performance for single-user transmission when frequency reuse is not used.

In this situation where an active UE 110 cannot be placed into near reuse, the controller 104 defines a simulcast group for that UE 110 that includes one or more RPs 106 (and the associated antennas 108) that are associated with all of the antenna ports used for the selected downlink transmission mode.

As noted above, in this example the distribution matrix G is configured so that at least one precoder matrix provides peak power to all of the antenna ports used for the transmission mode.

For example, in the example described herein connection with FIG. 1, the controller 104 defines a simulcast group for that UE 110 that includes RPs 106 and antennas 108 assigned to all of the antenna ports (that is, RPs 0 and 1 and antennas 0, 1, 2 and 3). Then, user data can be transmitted to such a UE 110 using the precoder matrix that provides peak power to all of the antenna ports used for the transmission mode.

In the embodiment shown in FIG. 4, method 400 further comprises, if an active UE 110 cannot be placed into near reuse with any other active UE 110, using a referenceSignalPower (Pa) equal to 0 dB (that is, Pa=0 dB) for user-data transmissions to that UE 110 (block 416). As noted above, this is done to provide increased transmission performance for single-user transmission when frequency reuse is not used.

Other embodiments can be implemented in other ways.

Figure 5:
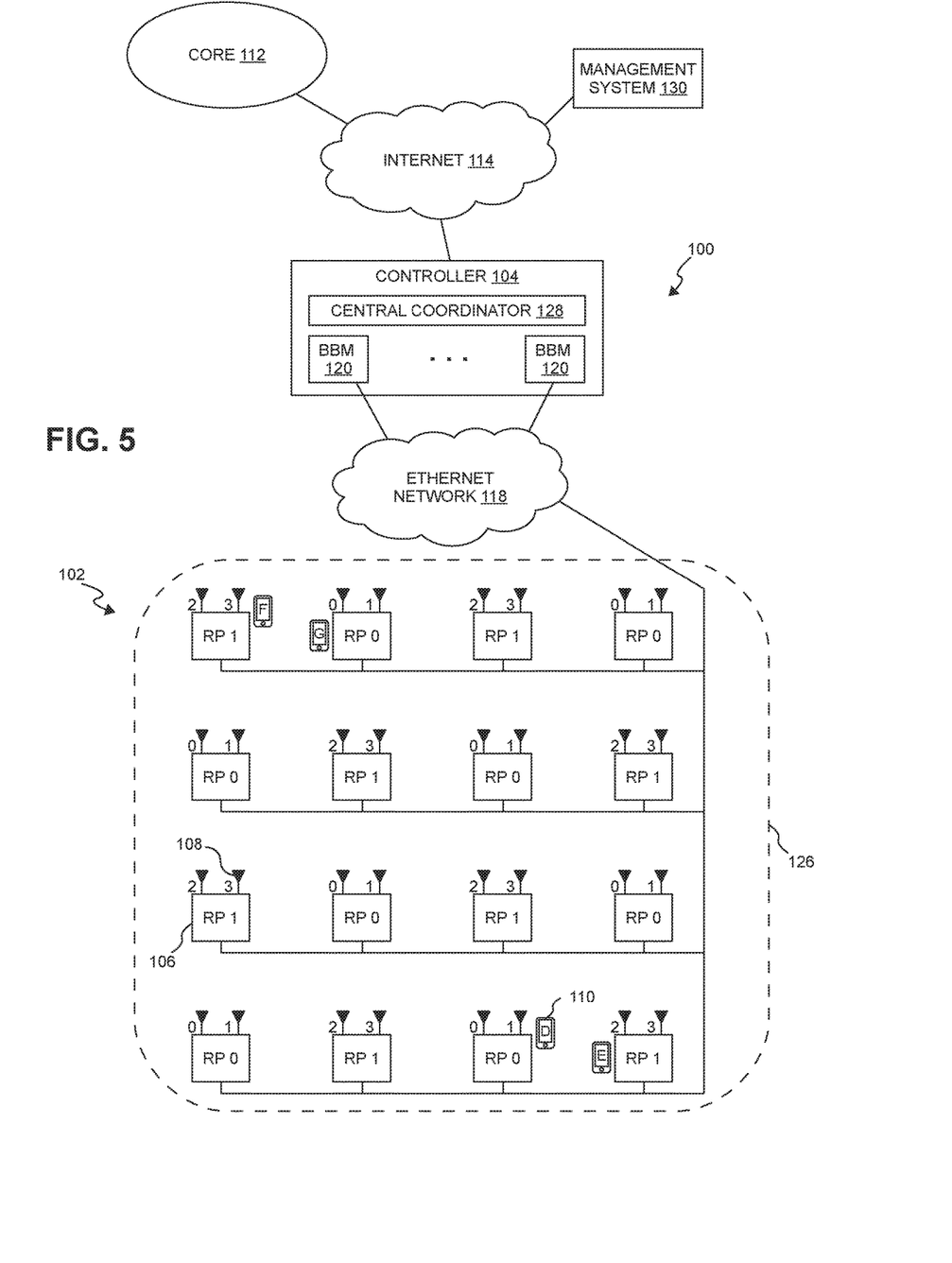
FIG. 5 is a block diagram of another example illustrated in the radio access network of FIG. 1.

As noted above, near reuse can be combined with far reuse. That is, two UEs 110 that are in near reuse using the techniques described above in connection with FIG. 4 can also be placed into far reuse with one or more other UEs 110 having high path loss with those two UEs 110. For example, in the example shown in FIG. 1, if UE C has high path loss with UEs A and B, UEs A and B can be placed into near reuse as described above while UEs A and B are placed into far reuse with UE C so that the same resource element can be used to simultaneously transmit user data to UEs A, B, and C. Other combinations of near and far reuse are possible. For example, FIG. 5 illustrates another example in which UEs D and E have high path loss with UEs F and G. In the example shown in FIG. 5, UEs D and E are placed into near reuse with each other as described above, UEs F and G are placed into near reuse with each other as described above, and the UEs D and E are placed into far reuse with UEs F and G. As a result, the same resource element can be used to simultaneously transmit user data to UEs D, E, F, and G.

Moreover, the distribution matrix G can be selectively used with only some of the downlink transmission modes. For example, in an embodiment that supports LTE downlink transmissions modes 9 and 10, those downlink transmissions modes 9 and 10 can be implemented without using the distribution matrix G (for example, by skipping the distribution matrix G processing or by performing the distribution matrix G processing using an identity matrix for the matrix G).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a method of reusing a resource element to transmit user data to a plurality of items of user equipment using a downlink transmission mode that uses multiple antenna ports, wherein the downlink transmission mode precodes sequences of symbols using a precoder matrix selected from a codebook, wherein the precoding produces sequences of precoded symbols, the method comprising: performing linear transformations on the sequences of precoded symbols using a distribution matrix, wherein the distribution matrix is configured so that each of a plurality of precoder matrices provides perfect steering of transmit power to a corresponding one of a plurality of disjoint subsets of the antenna ports used for the downlink transmission mode; determining if the resource element can be reused to transmit user data to the plurality of items of user equipment; and when the resource element can be reused, reusing the resource element to transmit user data to the plurality of items of user equipment by: assigning a respective simulcast group to each of the plurality of items of user equipment that uses a respective one of the plurality of disjoint subsets of antenna ports; and transmitting user data to each of the items of user equipment using a respective precoder matrix that provides perfect steering to the respective subset of antenna ports in the respective simulcast group for that item of user equipment.

Example 2 includes the method of Example 1, further comprising: when the resource element can be reused, transmitting user data at a first power level that is less than a second power level at which reference signals are transmitted to the items of user equipment.

Example 3 includes the method of any of the Examples 1-2, wherein the distribution matrix is configured so that at least one precoder matrix provides peak power at all of the antenna ports used for the downlink transmission mode; and wherein the method further comprises, when the resource element cannot be reused, using the resource element to transmit user data to one of the items of user equipment by: assigning to said one of the items of user equipment that a simulcast group that uses all of the antenna ports for the downlink transmission mode; and transmitting user data to said one of the items of user equipment using said at least one precoder matrix that provides perfect steering to all of the antenna ports.

Example 4 includes the method of any of the Examples 1-3, further comprising: when the resource element cannot be reused, transmitting user data to said one of the items of user equipment at a power level that is used to transmit reference signals to the items of user equipment.

Example 5 includes the method of any of the Examples 1-4, wherein the distribution matrix is configured to be unitary and to have, for each column of the distribution matrix, a non-zero gain for a corresponding entry associated with each antenna port.

Example 6 includes the method of any of the Examples 1-5, wherein the method is implemented using a controller and a plurality of radio points communicatively coupled to the controller, each radio point associated with at least one antenna.

Example 7 includes the method of Example 6, wherein the controller is communicatively coupled to the radio points using a switched ETHERNET network.

Example 8 includes the method of any of the Examples 6-7, wherein performing the linear transformation on the sequences of precoded symbols using the distribution matrix comprises performing the linear transformation on the sequences of precoded symbols using the distribution matrix by the controller.

Example 9 includes the method of any of the Examples 6-8, wherein performing the linear transformation on the sequences of precoded symbols using the distribution matrix comprises performing the linear transformation on the sequences of precoded symbols using the distribution matrix at one or more of the radio points.

Example 10 includes the method of any of the Examples 1-9, wherein the downlink transmission mode comprises a multiple-antenna Long-Term Evolution (LTE) downlink transmission mode.

Example 11 includes a system to provide wireless service to user equipment, the system comprising: a controller communicatively coupled to a core network of a wireless service provider; a plurality of radio points to transmit and receive radio frequency signals to and from the user equipment, each of the radio points associated with at least one antenna and located remote from the controller, wherein the plurality of radio points is communicatively coupled to the controller; and wherein the controller and plurality of radio points implement a base station for a radio access network; wherein the system is configured to reuse a resource element in order to transmit user data to a plurality of items of user equipment using a downlink transmission mode that uses multiple antenna ports; wherein the system is configured to implement a downlink transmission mode that precodes sequences of symbols using a precoder matrix selected from a codebook, wherein the precoding produces sequences of precoded symbols; wherein the system is configured to perform linear transformations on the sequences of precoded symbols using a distribution matrix, wherein the distribution matrix is configured so that each of a plurality of precoder matrices provides perfect steering of transmit power to a corresponding one of a plurality of disjoint subsets of the antenna ports used for the downlink transmission mode; wherein the system is configured to determine if the resource element can be reused to transmit user data to the plurality of items of user equipment; and wherein the system is configured to, when the resource element can be reused, reuse the resource element to transmit user data to the plurality of items of user equipment by: assigning a respective simulcast group to each of the plurality of items of user equipment that uses a respective one of the plurality of disjoint subsets of antenna ports; and transmitting user data to each of the items of user equipment using a respective precoder matrix that provides perfect steering to the respective subset of antenna ports in the respective simulcast group for that item of user equipment.

Example 12 includes the system of Example 11, wherein the system is configured to, when the resource element can be reused, transmit user data at a first power level that is less than a second power level at which reference signals are transmitted to the items of user equipment.

Example 13 includes the system of any of the Examples 11-12, wherein the distribution matrix is configured so that at least one precoder matrix provides peak power at all of the antenna ports used for the downlink transmission mode; and wherein the system is configured to, when the resource element cannot be reused, use the resource element to transmit user data to one of the items of user equipment by: assigning to said one of the items of user equipment that a simulcast group that uses all of the antenna ports for the downlink transmission mode; and transmitting user data to said one of the items of user equipment using said at least one precoder matrix that provides perfect steering to all of the antenna ports.

Example 14 includes the system of any of the Examples 11-13, wherein the system is configured to, when the resource element cannot be reused, transmit user data to said one of the items of user equipment at a power level that is used to transmit reference signals to the items of user equipment.

Example 15 includes the system of any of the Examples 11-14, wherein the distribution matrix is configured to be unitary and to have, for each column of the distribution matrix, a non-zero gain for a corresponding entry associated with each antenna port.

Example 16 includes the system of any of the Examples 11-15, wherein the controller is communicatively coupled to the radio points using a switched ETHERNET network.

Example 17 includes the system of any of the Examples 11-16, wherein the controller is configured to perform the linear transformation on the sequences of precoded symbols using the distribution matrix by the controller.

Example 18 includes the system of any of the Examples 11-17, wherein one or more of the radio points are configured to perform the linear transformation on the sequences of precoded symbols using the distribution matrix at one or more of the radio points.

Example 19 includes the system of any of the Examples 11-18, wherein the downlink transmission mode comprises a multiple-antenna Long-Term Evolution (LTE) downlink transmission mode.

Example 20 includes the system of any of the Examples 11-19, wherein the downlink transmission mode uses four antenna ports, and wherein each of the plurality of disjoint subsets of antenna ports comprises two antenna ports.

Example 21 includes the system of Example 20, wherein each radio point is associated with two antenna ports.

Example 22 includes the system of any of the Examples 20-21, wherein each radio point is associated with one antenna port.

Example 23 includes the system of any of the Examples 11-22, wherein the system is configured to not use the distribution matrix for some at least one other downlink transmission mode.

What is claimed is:

1. A method of reusing a resource element to transmit user data to a plurality of items of user equipment using a downlink transmission mode that uses multiple antenna ports, wherein the downlink transmission mode precodes sequences of symbols using a precoder matrix selected from a codebook, wherein the precoding produces sequences of precoded symbols, the method comprising:
    performing linear transformations on the sequences of precoded symbols using a distribution matrix, wherein the distribution matrix is configured so that each of a plurality of precoder matrices provides perfect steering of transmit power to a corresponding one of a plurality of disjoint subsets of the antenna ports used for the downlink transmission mode;
    determining if the resource element can be reused to transmit user data to the plurality of items of user equipment; and
    when the resource element can be reused, reusing the resource element to transmit user data to the plurality of items of user equipment by:

assigning a respective simulcast group to each of the plurality of items of user equipment that uses a respective one of the plurality of disjoint subsets of antenna ports; and transmitting user data to each of the items of user equipment using a respective precoder matrix that provides perfect steering to the respective subset of antenna ports in the respective simulcast group for that item of user equipment.

2. The method of claim 1, further comprising:

when the resource element can be reused, transmitting user data at a first power level that is less than a second power level at which reference signals are transmitted to the items of user equipment.

3. The method of claim 1, wherein the distribution matrix is configured so that at least one precoder matrix provides peak power at all of the antenna ports used for the downlink transmission mode; and wherein the method further comprises, when the resource element cannot be reused, using the resource element to transmit user data to one of the items of user equipment by:

assigning to said one of the items of user equipment that a simulcast group that uses all of the antenna ports for the downlink transmission mode; and transmitting user data to said one of the items of user equipment using said at least one precoder matrix that provides perfect steering to all of the antenna ports.

4. The method of claim 1, further comprising:

when the resource element cannot be reused, transmitting user data to said one of the items of user equipment at a power level that is used to transmit reference signals to the items of user equipment.

5. The method of claim 1, wherein the distribution matrix is configured to be unitary and to have, for each column of the distribution matrix, a non-zero gain for a corresponding entry associated with each antenna port.

6. The method of claim 1, wherein the method is implemented using a controller and a plurality of radio points communicatively coupled to the controller, each radio point associated with at least one antenna.

7. The method of claim 6, wherein performing the linear transformation on the sequences of precoded symbols using the distribution matrix comprises performing the linear transformation on the sequences of precoded symbols using the distribution matrix by the controller.

8. The method of claim 6, wherein performing the linear transformation on the sequences of precoded symbols using the distribution matrix comprises performing the linear transformation on the sequences of precoded symbols using the distribution matrix at one or more of the radio points.

9. A system to provide wireless service to user equipment, the system comprising:

a controller communicatively coupled to a core network of a wireless service provider;

a plurality of radio points to transmit and receive radio frequency signals to and from the user equipment, each of the radio points associated with at least one antenna and located remote from the controller, wherein the plurality of radio points is communicatively coupled to the controller; and wherein the controller and plurality of radio points implement a base station for a radio access network;

wherein the system is configured to reuse a resource element in order to transmit user data to a plurality of items of user equipment using a downlink transmission mode that uses multiple antenna ports;

wherein the system is configured to implement a downlink transmission mode that precodes sequences of symbols using a precoder matrix selected from a codebook, wherein the precoding produces sequences of precoded symbols;

wherein the system is configured to perform linear transformations on the sequences of precoded symbols using a distribution matrix, wherein the distribution matrix is configured so that each of a plurality of precoder matrices provides perfect steering of transmit power to a corresponding one of a plurality of disjoint subsets of the antenna ports used for the downlink transmission mode;

wherein the system is configured to determine if the resource element can be reused to transmit user data to the plurality of items of user equipment; and wherein the system is configured to, when the resource element can be reused, reuse the resource element to transmit user data to the plurality of items of user equipment by:

assigning a respective simulcast group to each of the plurality of items of user equipment that uses a respective one of the plurality of disjoint subsets of antenna ports; and transmitting user data to each of the items of user equipment using a respective precoder matrix that provides perfect steering to the respective subset of antenna ports in the respective simulcast group for that item of user equipment.

10. The system of claim 9, wherein the system is configured to, when the resource element can be reused, transmit user data at a first power level that is less than a second power level at which reference signals are transmitted to the items of user equipment.

11. The system of claim 9, wherein the distribution matrix is configured so that at least one precoder matrix provides peak power at all of the antenna ports used for the downlink transmission mode; and wherein the system is configured to, when the resource element cannot be reused, use the resource element to transmit user data to one of the items of user equipment by:

assigning to said one of the items of user equipment that a simulcast group that uses all of the antenna ports for the downlink transmission mode; and transmitting user data to said one of the items of user equipment using said at least one precoder matrix that provides perfect steering to all of the antenna ports.

12. The system of claim 9, wherein the system is configured to, when the resource element cannot be reused, transmit user data to said one of the items of user equipment at a power level that is used to transmit reference signals to the items of user equipment.

13. The system of claim 9, wherein the distribution matrix is configured to be unitary and to have, for each column of the distribution matrix, a non-zero gain for a corresponding entry associated with each antenna port.

14. The system of claim 9, wherein the controller is communicatively coupled to the radio points using a switched ETHERNET network.

15. The system of claim 9, wherein the controller is configured to perform the linear transformation on the sequences of precoded symbols using the distribution matrix by the controller.

16. The system of claim 9, wherein one or more of the radio points are configured to perform the linear transformation on the sequences of precoded symbols using the distribution matrix at one or more of the radio points.

17. The system of claim 9, wherein the downlink transmission mode comprises a multiple-antenna Long-Term Evolution (LTE) downlink transmission mode.

18. The system of claim 9, wherein the downlink transmission mode uses four antenna ports, and wherein each of the plurality of disjoint subsets of antenna ports comprises two antenna ports.

19. The system of claim 18, wherein each radio point is associated with either two antenna ports or one antenna port.

20. The system of claim 9, wherein the system is configured to not use the distribution matrix for some at least one other downlink transmission mode.

* * * * *